No. 752,014. PATENTED FEB. 9, 1904.
L. A. WIESMAN.
COMBINED LEVEL AND SQUARE.
APPLICATION FILED SEPT. 18, 1903.
NO MODEL.

Witnesses
M. E. Corder
Geo. E. Tew

Inventor
Lester A. Wiesman
by Milo B. Stevens & Co
Attorneys

No. 752,014. Patented February 9, 1904.

UNITED STATES PATENT OFFICE.

LESTER A. WIESMAN, OF CLEVELAND, OHIO, ASSIGNOR OF TWO-THIRDS TO EDWARD KOHL AND ALFRED FOX, OF CLEVELAND, OHIO.

COMBINED LEVEL AND SQUARE.

SPECIFICATION forming part of Letters Patent No. 752,014, dated February 9, 1904.

Application filed September 18, 1903. Serial No. 173,649. (No model.)

*To all whom it may concern:*

Be it known that I, LESTER A. WIESMAN, a citizen of the United States, residing at Cleveland, in the county of Cuyahoga and State of Ohio, have invented certain new and useful Improvements in a Combined Level and Square; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention comprises a combined level, square, and inclinometer, which will be found useful in trying and testing work and in determining angles of inclination.

The object of the invention is to produce an improved device of the kind stated adapted particularly to be removably attached to any convenient straight-edge and including in small compass an instrument of light weight suitable for the various purposes indicated.

The device is illustrated in the accompanying drawings, in which—

Figure 1:
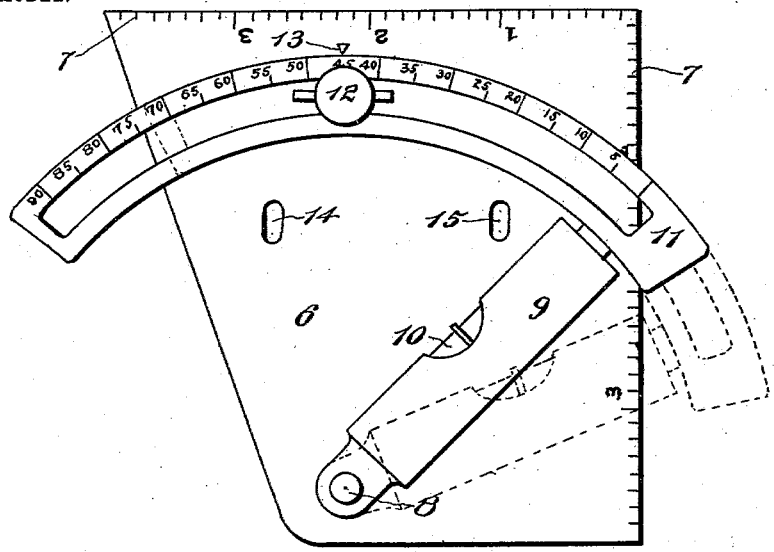
Figure 2:
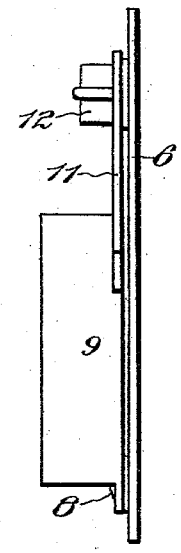

Figure 1 is a plan view thereof. Fig. 2 is an edge view thereof, and Fig. 3 is a plan view showing the device applied to a straight-edge.

Referring particularly to the drawings, the implement comprises a plate 6, having three edges at right angles one to another, two of which may be graduated, as at 7. Pivoted to this plate at 8 is a casing 9, containing a spirit-level, as indicated at 10, and the other end of the casing is joined to a slotted quadrant 11, having the degrees marked thereon. The quadrant swings with the spirit-level and may thus be adjusted at various angles to the square and fixed at adjustment by the wing-nut 12, the stem of which extends through the slot. An index-mark 13 on the plate shows the angles, this mark being equidistant with the pivot 8 from the base edge of the square, as will be readily understood.

Figure 3:
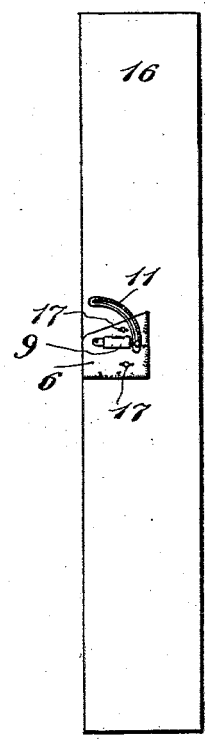

At 14 and 15 slotted holes are indicated which are useful in attaching the device to a straight-edge for use as a plumb or level, as indicated in Fig. 3. In this case the device is attached to a straight-edge piece 16, with one of the edges of the square parallel to or flush with the straight-edge, by means of screws 17, inserted through the holes, which are slotted to allow the necessary adjustment to bring the edges to exact parallelism to insure accuracy. This permits the device to be attached to any convenient straight-edge and avoids the necessity for carrying around a long plumb-bar or straight-edge piece.

The quadrant is concentric with the pivot 8, and its swing permits the level to be placed parallel to either edge of the square or to be placed at any angle within the ninety degrees, and when the edge of the square is placed along a piece of work and the level brought to a level the pointer 13 will show on the quadrant the angle of inclination.

The device is small and may be easily carried and will be found convenient and useful for the purposes indicated.

What I claim as new, and desire to secure by Letters Patent, is—

The combination with a plate having edges at a right angle, forming a square corner, of a spirit-level pivoted at one end thereof adjacent said corner and constructed to swing over the face of the plate, a quadrant fixed to the other end of the level and swinging concentrically therewith over the face of the plate, and an index on the plate, for the quadrant.

In testimony whereof I do affix my signature in presence of two witnesses.

LESTER A. WIESMAN.

Witnesses:
JOHN A. BOMMHARDT,
LOTTIE NEWBURN.